US 8,243,599 B2

(12) United States Patent
Becker et al.

(10) Patent No.: US 8,243,599 B2
(45) Date of Patent: Aug. 14, 2012

(54) METHOD AND APPARATUS FOR HIGH RESOLUTION PASSIVE NETWORK LATENCY MEASUREMENT

(75) Inventors: Daniel L. Becker, Frederick, MD (US); Todd J. Lizambri, Frederick, MD (US); Choon B. Shim, Ijamsville, MD (US); Xiang Yu, Gaithersburg, MD (US)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 11/555,484

(22) Filed: Nov. 1, 2006

(65) Prior Publication Data

US 2008/0247331 A1 Oct. 9, 2008

(51) Int. Cl.
*H04L 12/26* (2006.01)

(52) U.S. Cl. ........ 370/232; 370/253; 370/252; 370/234; 370/233

(58) Field of Classification Search .................. None
See application file for complete search history.

(56) References Cited

U.S. PATENT DOCUMENTS

| | | | | | |
|---|---|---|---|---|---|
| 5,521,907 | A | * | 5/1996 | Ennis et al. | 370/253 |
| 5,923,673 | A | * | 7/1999 | Henrikson | 714/712 |
| 5,941,951 | A | * | 8/1999 | Day et al. | 709/233 |
| 5,973,613 | A | * | 10/1999 | Reis et al. | 340/7.23 |
| 6,499,009 | B1 | * | 12/2002 | Lundberg et al. | 704/211 |
| 6,738,355 | B1 | * | 5/2004 | Love et al. | 370/252 |
| 6,928,473 | B1 | | 8/2005 | Sundaram et al. | |
| 2002/0039371 | A1 | * | 4/2002 | Hedayat et al. | 370/516 |
| 2003/0115321 | A1 | * | 6/2003 | Edmison et al. | 709/224 |
| 2006/0077902 | A1 | * | 4/2006 | Kannan et al. | 370/250 |

* cited by examiner

*Primary Examiner* — Huy D Vu
*Assistant Examiner* — Zewdu A Beyen
(74) *Attorney, Agent, or Firm* — Schwegman, Lundberg & Woessner, P.A.

(57) ABSTRACT

A method includes receiving a first capture time corresponding to a first time that a data packet is received at a first probe and a second capture time corresponding to a second time that the data packet is received at a second probe. The data packet is from existing network traffic transmitted over a data network. The first and second probes can be configured to capture the data packet in response to a capture instruction. The first capture time and second capture time are different and are used to calculate the latency of at least a portion of a data network.

23 Claims, 5 Drawing Sheets

METHOD AND APPARATUS FOR HIGH RESOLUTION PASSIVE NETWORK LATENCY MEASUREMENT

FIELD OF INVENTION

The present invention is a method and apparatus for measuring and calculating the high resolution delay of existing network traffic transmitted through a data network without disrupting the flow of existing network traffic being measured for latency.

BACKGROUND

Measurement techniques commonly used for calculating packet delay through a network disrupt the flow of data and are only able to provide timing resolutions down to +/−10 millisecond. This is adequate for most network throughput applications. However, accuracy in the sub-millisecond range (resolutions down to 100 microseconds) is necessary to quantify the impact of network degradations on applications that are highly sensitive to network delay and jitter, such as Voice over Internet Protocol (VoIP) and Video on Demand (VoD) applications.

Measuring the delay between two points in a network with high (sub-millisecond) resolution is challenging because networks often include many segments with variable delay. In addition to the transport delay of each segment determined by the actual wire length of the connection, the router or switch at each end of each segment introduces additional delay caused by packet processing and queuing delays that are highly non-deterministic. The processing and queuing delays are dependent upon the type and configuration of the routers and switches, as well as the existing user traffic routed through the routers and switches in a myriad of directions. The multiplicity of segments that generally make up a large network increase the complexity of deterministically calculating the delay over a data network.

Conventional network delay measurement techniques generate special network traffic to accomplish the delay measurement of a data network, but these techniques are inadequate in measuring the network latencies of existing network traffic at high resolutions. First, the intrusive traffic generated by these techniques is often an unrepresentative approximation of user traffic and therefore is inaccurate and unreliable. Generated traffic cannot be guaranteed to follow the same path with the same priority and through the same queues as existing user traffic. Also, the traffic introduced by conventional network delay measurement techniques degrades the quality of service between users over the network and can have an impact on the accuracy of the delay measurement. The special network traffic injected for the latency measurement is itself additional traffic on the network that is unavoidably accounted for in the latency calculation. Finally, since these techniques can only report the delay measurement at the exact instant that the intrusive traffic is generated, any increase in the rate of latency measurements will further disrupt the flow of existing network traffic and degrade the quality of service of the network to users. Thus, a need exists for a method and apparatus for calculating network traffic within a data network.

SUMMARY

A method includes receiving a first capture time corresponding to a first time that a data packet is received at a first probe and a second capture time corresponding to a second time that the data packet is received at a second probe The data packet is from existing network traffic transmitted over a data network. The first and second probes can be configured to capture the data packet in response to a capture instruction. The first capture time and second capture time are different and are used to calculate the latency of at least a portion of a data network.

DETAILED DESCRIPTION

A network device and method for passively measuring the latency of a data network with high resolution includes a network management component, a time synchronization server, and probes. The probes are configured to passively (e.g., without disrupting existing network traffic) and/or randomly capture packets from existing network traffic transmitted across at least a portion of the data network to be measured and assign capture times to the packets without disrupting the existing network traffic. Existing network traffic is network traffic generated by devices communicating over the network and is not dummy network traffic injected into the network specifically for latency measurement purposes. Existing network traffic can also be referred to as non-injected network traffic that is communicated (e.g., transferred, transmitted) over the data network.

In addition, the probes are programmed with capture instructions that are used to trigger the probes to capture packets with significant overlap in the types and number of packets to properly accomplish the delay calculation. After the probes are synchronized with one another, the probes are prompted to capture and assign capture times to data packets. The latency across of the portion of the data network is calculated by associating the data packets captured by each of the probes and then by computing the difference in capture times between the probes. Communication related to the latency calculation occurs in a mode that does not disrupt the measurement of the latency calculation or the flow of existing network traffic transmitted across the portion of the data network.

In other words, because actual existing network traffic is used to calculate, for example, latency over data network, the latency measurements will be more representative of the actual traffic over the portion of the data network. The network traffic used for measurement purposes will, in many embodiments, be non-deterministic traffic subject to the paths, priorities, and queues of existing user traffic. The network traffic used for measurement purposes will not be traffic injected into the data network for measurement purposes and will decrease the likelihood of degrading the quality of service between users over the network and impacting the accuracy of the delay measurement.

Figure 1:
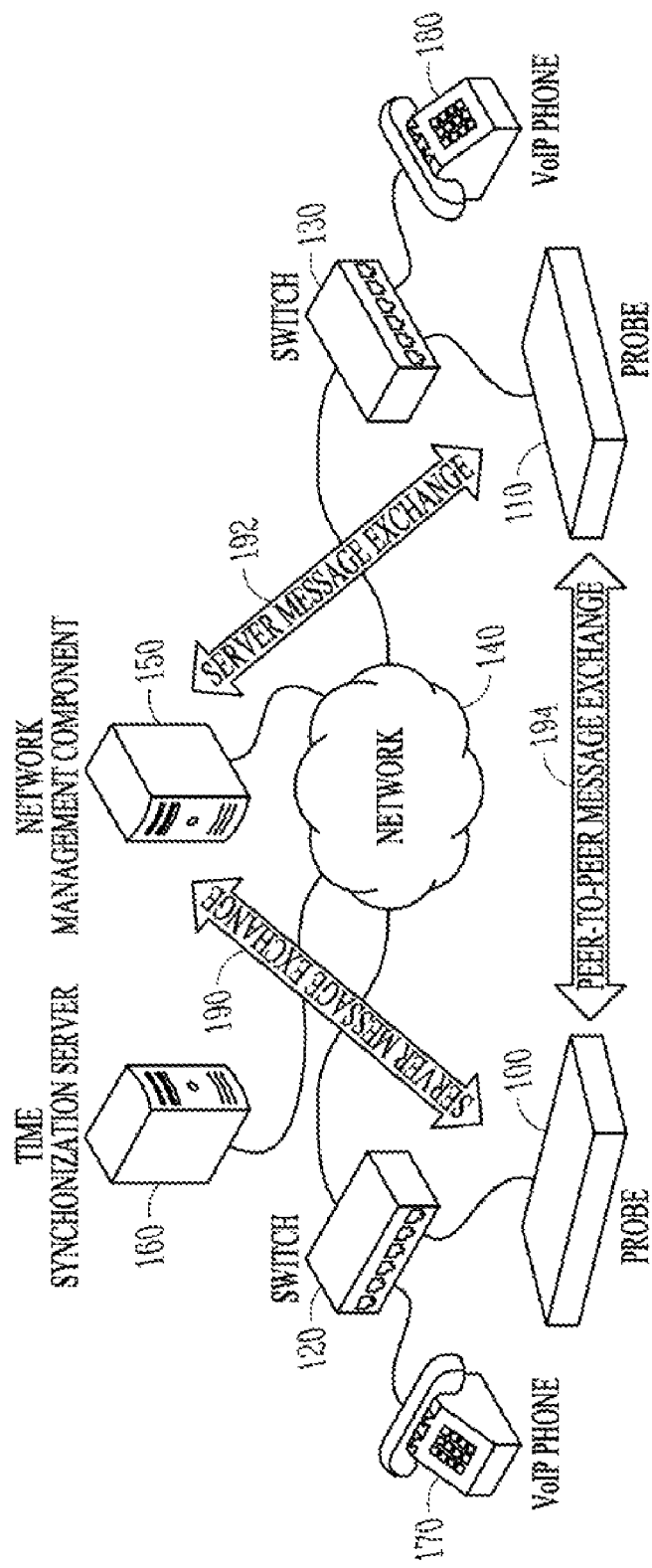
FIG. 1 is a schematic diagram illustrating the devices used in measuring the latency of a network, according to an embodiment of the invention.

In the embodiment illustrated in FIG. 1, the latency of the communication between VoIP phone 170 and VoIP phone 180 over network 140 is being measured through the access points of switches 120 and 130. The figure shows VoIP phone 170 connected through switch 120 to the network 140 and VoIP phone 180 connected through switch 130 to the network 140. The network 140 can be any type of network including a local area network (LAN) or wide area network (WAN) implemented as a wired or wireless network and, in some embodiments, can include multiple network segments.

The probes that are used to measure the latency of the communication between the VoIP phones 170 and 180 over the network 140 are configured to passively monitor/detect network traffic through the switches 120 and 130. This figure shows that probe 100 is connected as a passive device to monitor the network 140 through switch 120 and probe 110 is connected, also as a passive device to monitor the network 140, through switch 130. Although the probes 100 and 110 are separate devices from the VoIP phones 170 and 180, in another embodiment of this invention each of the VoIP phones or other network components, including other probes within the network, can be configured to function as passive probes that monitor network traffic exchanged between various devices through single or even multiple access points within the network.

This figure shows a time synchronization server 160 that synchronizes the timing of the network 140 as well as the probes 100 and 110 and the network management component 150. This synchronization typically occurs every five seconds, but can be adjusted according to the requirements of the network 140, the probes 100 and 110, or the network management component 150. For example, if communication over the network is sensitive to variations in timing, the synchronization frequency can be increased. Because the latency measurement calculation in this embodiment is a result of the difference in capture times assigned to packets by each of the probes 100 and 110, synchronization of the probes 100 and 110 is necessary to produce an accurate latency measurement calculation Although in this embodiment, the probes 100 and 110 are synchronized with the network through a time synchronization server 160, in an alternative embodiment, the probes 100 and 110 can be synchronized to a timing that is separate from that of a network through a separate timing device or even a timing device integrated into one or both probes 100 and 110.

The server message exchanges 190 and 192 represent the communication between the probes 100 and 110, respectively, and the network management component 150. The server message exchanges 190 and 192 are communications related to the network latency measurement and calculation and are out-of-band with existing network traffic such as communication between VoIP phone 170 and VoIP phone 180. The out-of-band server message exchanges 190 and 192 in this embodiment includes communication such as the latency calculations from the probes 100 and 110, respectively, to the network management component 150. Peer-to-peer message exchange 194 represents communication that occurs over the network 140 between probe 100 and probe 110 related to the latency measurement and calculation. The peer-to-peer message exchange 194 is communication that occurs out-of-band with existing network traffic and includes communication such as the sending of capture time data from probe 100 to probe 110. The communication between devices can also occur in-band as long as it does not disrupt the latency measurement or adversely affect network traffic.

In this embodiment, probe 100 and probe 110 have been manually programmed to capture typical data packets transmitted between VoIP phone 170 and VoIP phone 180 according to/in response to capture instructions. In some embodiments, the probes 100 and 110 are configured to passively capture indicators of the data packets (rather than the data packets). Probe 100 has been programmed to capture all of the inbound data packets received by and outbound data packets sent from VoIP phone 170, and assign a capture time to each packet corresponding to the time that the packet was captured. The capture instructions contain an instruction to trigger the probe 100 to capture and assign capture times for a two second capture time window after receiving a start capture signal from the network management component 150 via an out-of-band server message exchange 190. Since VoIP phones engaged in a communication regularly generate real-time transport protocol (RTP) packets (e.g., in twenty millisecond intervals), capturing packets for, for example, one second will generate enough data for the latency calculation in this embodiment. Probe 100 has also been programmed to send the packet sequence number from the header of each packet, uniquely identifying each of the captured data packets, along with the capture time to probe 110 through out-of-band peer-to-peer message exchange 194.

Probe 110, like probe 100, is programmed to capture data packets for two seconds and assign capture times after receiving the same start capture signal from the network management component 150 that is sent to probe 100. Probe 110, however, is programmed to capture inbound data packets received by and outbound data packets sent from VoIP phone 180 rather than VoIP phone 170. Probe 110 is also programmed to send its data via a peer-to-peer message exchange 194 to probe 100. The probes 100 and 110 start capturing data at the same time based on a single start capture signal to ensure an overlap in the packets captured by the probes 100 and 110.

If other devices, in addition to the VoIP phones 170 and 180, are connected to the respective switches 120 and 130, the probes 100 and 110 can be configured using the capture instructions to trigger the probes 100 and 110 to capture the data packets from other devices in addition to the inbound and outbound traffic from VoIP phones 170 and 180. The probes 100 and 110 or any other device that performs the latency calculations can be programmed to separately calculate latency for each additional device.

The probes 100 and 110 have also been configured/programmed using the capture instructions to locally calculate latency and send the results to the network management component 150 through out-of-band server message exchanges 190 and 192, respectively, using the inbound and outbound data sent from the other probe. To accomplish the latency calculations, the probes 100 and 110 associate the capture times stored locally with the capture times transmitted from the other probe by matching the packet sequence numbers that were transmitted with the capture times. The probes 100 and 110 calculate the network latency for each packet sequence number by computing the difference in the capture times assigned by the respective probes. By receiving capture times and associated packet sequence numbers from the other probe, probe 100 and probe 110 have the data necessary to independently calculate the latency for the inbound and outbound traffic for both of the VoIP phones 170 and 180. For example, probe 100 can calculate latency for the outbound path from VoIP phone 170 using the inbound data sent from probe 110 and the outbound data stored locally on probe 100. Likewise, probe 110 can independently calculate the same latency for the outbound path from VoIP phone 170, which would be the same latency calculation as the inbound path into VoIP phone 180, using the inbound data stored locally on probe 110 and the outbound data sent from probe 100.

In this embodiment, to avoid duplication in latency calculations, probe 100 calculates only the latency for outbound traffic transmitted by VoIP phone 170 and probe 110 calculates only the latency for outbound traffic transmitted by phone VoIP phone 180. Because the outbound communication from each VoIP phone 170 and 180 can be occurring via different paths, the potentially different latency measurements of these two paths are calculated so that they can be reported separately. In an alternative embodiment, each of the probes can be configured to send a limited set of data to the other probe for a latency calculation. For example, probe 100 can be configured to only send its outbound data to probe 110. Probe 110 can then calculate latency for a single path using the outbound data from probe 100 and the inbound data stored locally on probe 110. The probes can be configured so that only one of the probes calculates any combination of inbound and outbound latency from the perspective of a single VoIP phone.

Figure 2:
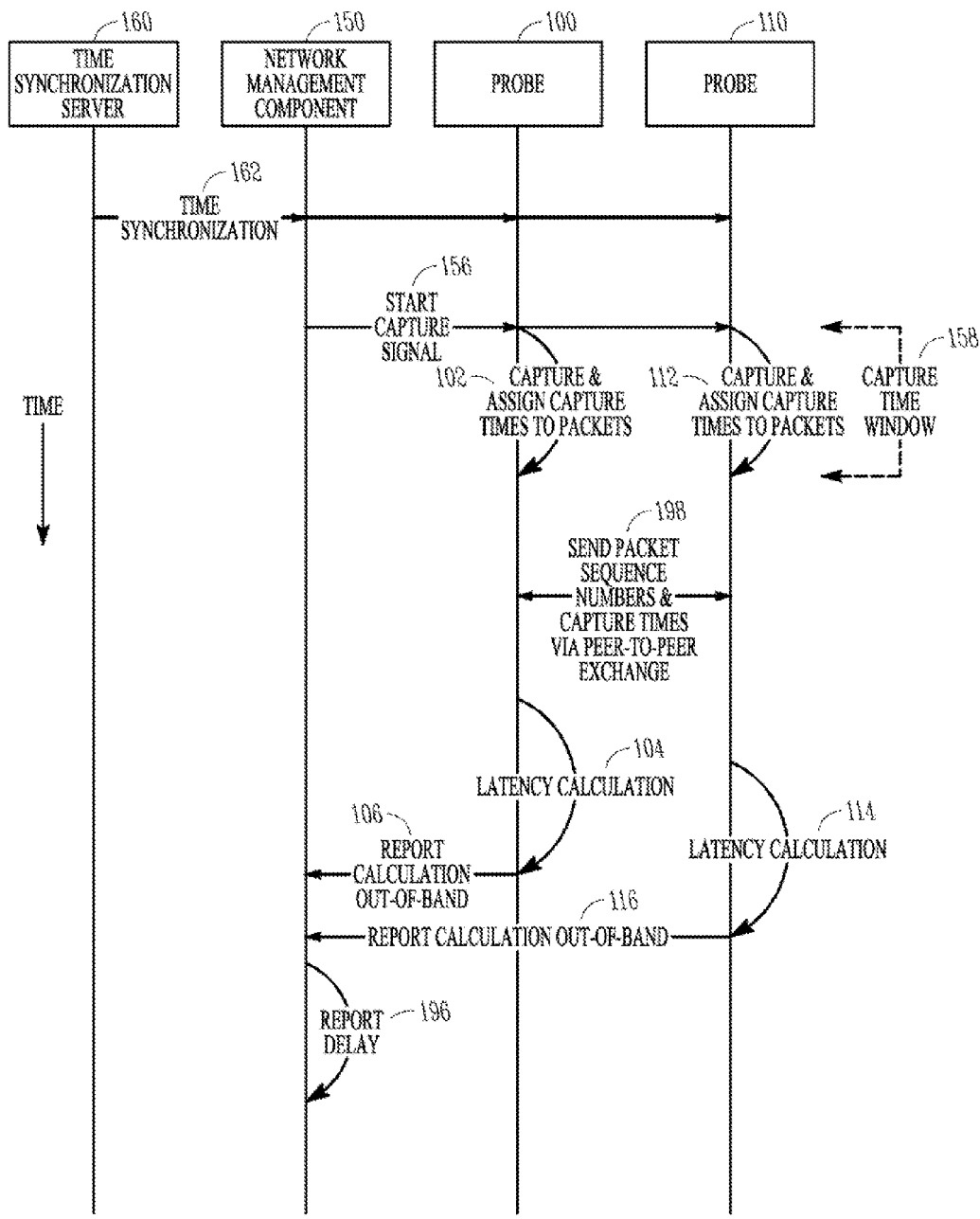
FIG. 2 is a schematic diagram of a flow of information between the devices in FIG. 1, according to an embodiment of the invention.

FIG. 2 illustrates the flow of information during a latency measurement cycle between the components described in FIG. 1, including the exchange of information that occurs in response to the capture instructions described above. The vertical axis represents time and the horizontal axis shows the components of the network illustrated in FIG. 1, specifically, probe 100, probe 110, the network management component 150, and the time synchronization server 160. During the entire exchange of information in the latency measurement cycle, network traffic is being created across the network 140 via VoIP phone 170, VoIP phone 180, and additional devices that can be connected to the network 140. This figures shows that the first event in the latency measurement cycle in this embodiment is the time synchronization 162 by the time synchronization server 160 of probe 100, probe 110, and the network management component 150. The synchronization of the timing of the probes 100 and 110 and the network management component 150 can occur at any time as long as the probes 100 and 110 are synchronized with one another before capturing data packets from the network and assigning capture times.

After the components have been synchronized with one another, the network management component 150 sends the start capture signal 156 to probe 100 and probe 110 to start monitoring the existing network traffic. The start capture signal 156 is sent via a communication channel that is out-of-band with existing network traffic. The probes 100 and 110, in response to the capture instructions, capture packets and assign capture times 102 and 112, respectively, during the capture time window 158.

After the capture time window 158 is completed, the packet sequence number from the packet header and the corresponding capture time for each captured data packet on probe 100, starting with the first packet after receiving the start capture signal 156 from the network management component 150, is transmitted in a peer-to-peer message exchange 198 to probe 110 over the network 140 out-of-band with the existing network traffic in response to the capture instructions. Likewise, also according to the capture instructions, the packet sequence number from the packet header and the corresponding capture time for each captured data packet on probe 110, starting with the first packet after receiving the start capture signal 156 from the network management component 150, is transmitted in a peer-to-peer message exchange 198 over the network 140 to probe 100 out-of-band with the existing network traffic. Although, the figure shows that the information is exchanged between the probes 100 and 110 at the same time, the information does not necessarily have to be communicated simultaneously. In this embodiment, the order of communication is not important as long as the probes 100 and 110 are able to exchange information to complete the latency calculations 104 and 114.

As was described earlier, the latency calculations 104 and 114 are accomplished locally and separately on each of the probes 100 and 110, respectively, according to the capture instructions. The probes 100 and 110 associate the capture times stored locally with the capture times transmitted from the other probe by matching the packet sequence numbers that were transmitted with the capture times. The probes 100 and 110 calculate the network latency for each packet sequence number by computing the difference in the capture times assigned by the respective probes. Although, the figure shows that the latency calculations 104 and 114 are performed in a staggered sequence, it is not necessary that the probes 100 and 110 make the calculations in any particular order, as long as calculations are completed before they are sent to the network management component 150. Also, the time that it takes to complete the latency calculations 104 and 114 can vary depending upon the amount of data collected and the complexity of the latency calculation required by each of the probes 100 and 110.

After the local calculation of the network latency is completed, probes 100 and 110 transmit their respective network latency calculations 106 and 116, respectively, to the network management component 150 via a server message exchange that is out-of-band with existing network traffic. Although, the figure shows that the latency calculations are communicated in a staggered sequence to the network management component 150, it is not necessary that the probes 100 and 110 communicate the information in any particular order to the network management component 150, as long as the network management component 150 is able to receive the information from the probes 100 and 110.

The probes 100 and 110 are programmed within the capture instructions to send the latency results with the packet sequence numbers to the network management component 150 via out-band server message exchanges 190 and 192, respectively, after the latency calculations are completed. The network management component 150 in this embodiment is configured to display the results for a user. In this embodiment, the network management component 150 reports the network latency calculations received from the probes 100 and 110 after the calculation is completed. But, in an alternative embodiment of this invention, the network management component can be programmed/configured to filter, report, send, store, or display the latency calculations separately or in any mathematical or statistical combination that would be useful for a user. Each of the probes or another device can also be programmed to perform these functions that are performed by the network management component.

In the embodiment illustrated in FIGS. 1-2, the data packet capture instructions were programmed manually on the probes 100 and 110, the network latency calculations 104 and 114 were accomplished locally on the probes 100 and 110, respectively, and peer-to-peer message exchange 198 occurred between the probes 100 and 110. However, the network management component 150 or another device can be configured to send the packet capture instructions and accomplish the network latency calculation so that peer-to-peer message exchange 198 will not be necessary. In an alternative server based embodiment described below, the network management component can send the data packet capture instructions and complete the network latency calculation.

Figure 3:
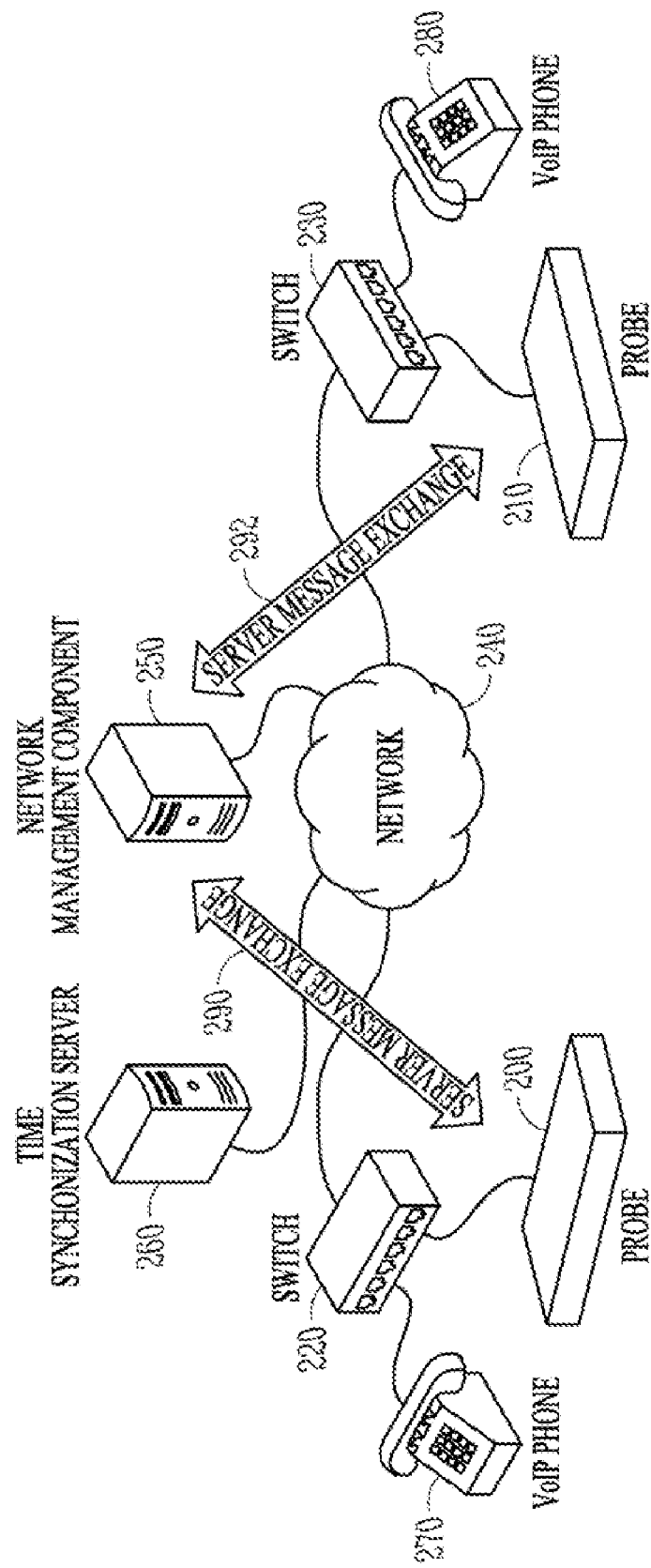
FIG. 3 is a schematic diagram illustrating the devices used in measuring the latency of a network, according to an alternative embodiment of the invention.

FIG. 3 is an illustration of the server based embodiment. The network 240 between the points at switch 220 and at switch 230 is the network being measured for latency. The network 240 can be any type of network including a LAN or WAN implemented as a wired or wireless network and can contain multiple segments. Probe 200 is connected as a passive device to the network 240 through switch 220. Probe 210 is connected, also as a passive device, to the network 240 through switch 230. Although the communication of a number of different devices can be monitored through the network 240, FIG. 3 shows VoIP phone 270 connected through switch 220 to the network 240 and VoIP phone 280 connected through switch 230 to the network 240. The server message exchanges 290 and 292 are the communication over the network between the probes 200 and 210 and the network management component 250. The server message exchanges 290 and 292 are communications related to the network latency calculation and are out-of-band with existing network traffic such as communication between VoIP phone 270 and VoIP phone 280.

Figure 4:
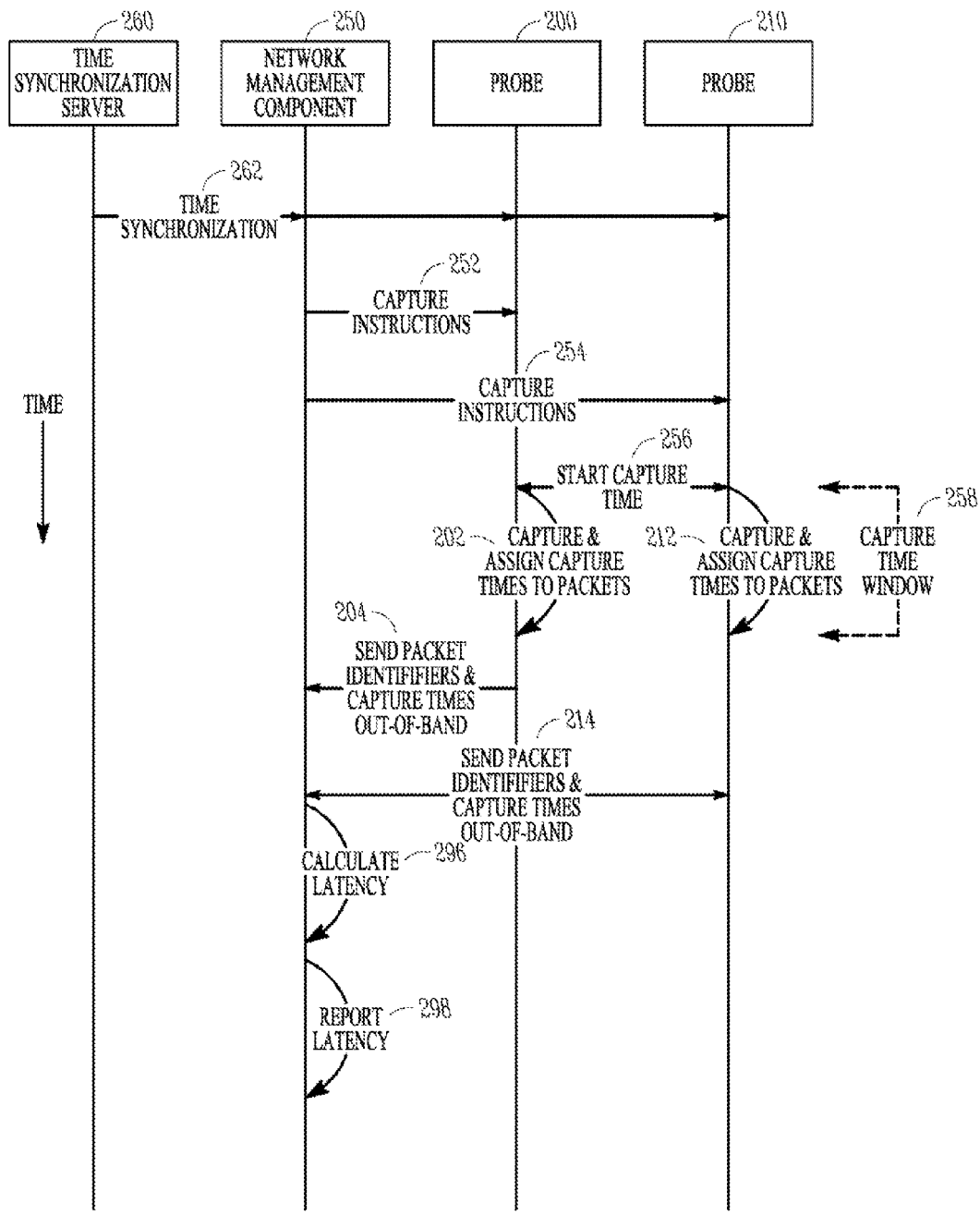
FIG. 4 is a schematic diagram of the flow of information between the devices in FIG. 3, according to an embodiment of the invention.

FIG. 4 illustrates the flow of information during a latency measurement cycle between the network components described in FIG. 3. The vertical axis represents time and the horizontal axis shows the components of the network illustrated in FIG. 3, specifically, probe 200, probe 210, the network management component 250, and the time synchronization server 260. During the entire exchange of information in the latency measurement cycle, user network traffic is being transmitted across the network 240 via VoIP phone 270, VoIP phone 280, and additional devices that can be connected to the network 240.

The first event in the latency measurement cycle in this embodiment is the time synchronization 262 by the time synchronization server 260 of the network management component 250, probe 200, and probe 210. The time synchronization does not necessarily have to occur before the capture instructions 252 and 254 are sent to the probes 200 and 210. It is only critical that the probes 200 and 210 are synchronized before assigning capture times to packets. In some embodiments, the time synchronization can be triggered by any one of the synchronization server 260, the network management component 250, probe 200 and/or probe 210.

After the devices are synchronized, in this embodiment, the network management component 250 sends capture instructions 252 to probe 200 first and then a separate set of capture instructions 254 to probe 210. In an alternative embodiment, the capture instructions 254 can be sent before or simultaneously with capture instructions 252. The capture instructions 252 and 254 are sent via communication channels that are out-of-band with existing network traffic. The capture instructions 252 and 254 contain a start capture time, a capture time window, and instructions for capturing and assigning capture times to identical data packets. The start capture time is a synchronized time that the probes 200 and 210 are to start capturing data packets from the network 240. The capture time window 258 is the amount of time that the probes 200 and 210 are to capture data packets and to assign capture times to those packets to accomplish the latency measurement. As was described in the embodiment in FIGS. 1-2, a capture time window 258 of two seconds will suffice for this particular application, however, the capture time window 258 can be modified to accommodate different scenarios.

The capture instructions 252 and 254 sent from the network management component 250 also contains instructions for reporting unique data packet identifiers and corresponding capture times of packets captured by probes 200 and 210 to the network management component 250. The unique data packet identifiers in this embodiment are the sequence numbers taken from headers of the capture data packets, but in an alternative embodiment, the unique data packet identifiers can be any information about the packets to differentiate them from one another including the entire packet itself. In the embodiment illustrated in FIG. 4, the capture instructions 252 and 254 contain instructions for staggered reporting of information from the probes 200 and 210 to the network management component 150. The capture instructions 252 sent specifically to probe 200 from the network management component 250 contain reporting instructions for probe 200 to send its unique data packet identifiers and corresponding capture time to the network management component 250 after the capture time window is completed, but before probe 210 transmits its unique data packet identifiers and corresponding capture times to the network management component 250.

This figure illustrates that at the synchronized start capture time 256, the probes 200 and 210 start capturing and assigning capture times to data packets 202 and 212, respectively, according to the capture instructions 252 and 254, respectively. After the capture time window 258 is complete, probe 200 sends its unique packet identifiers and corresponding capture times via out-of-band signaling to the network management component 250 according to the staggered reporting instructions within the capture instructions 252. Probe 210 subsequently sends its unique packet identifiers and corresponding capture times 214 according to the staggered reporting instructions within the capture instructions 254 to the network management component 250 via out-of-band signaling.

After probes 200 and 210 send their unique packet identifiers and corresponding capture times to the network management component 204 and 214, respectively, the network management component 250 calculates the latency 296 of the network 240. The network management component 250 first associates the capture times from the probes 200 and 210 by matching the unique packet identifiers transmitted with the capture times. The network management component 250 completes the latency calculation 296 by computing the inbound and outbound latencies using the capture times received from the probes 200 and 210. The network management component 250 then reports the network latency calculations 298.

In both of the embodiments described above, the probes store capture instructions locally and later execute the capture instructions. In alternative embodiments of this invention, the probes, rather than storing a set of capture instructions, can receive a multiplicity of separate instructions from a separate device such as a network management component to accomplish the latency measurement and calculation. For example, the network management component can be configured to send only an instruction, indicator, and/or signal to the probes to trigger the probes to capture data packets and assign capture times. The network management component can be configured to later send a separate instruction, indicator and/or signal to trigger the probes to exchange information. The network management server can be configured to continue to send single instruction(s), indicator(s), and/or signal(s) until the latency calculation is completed.

Figure 5:
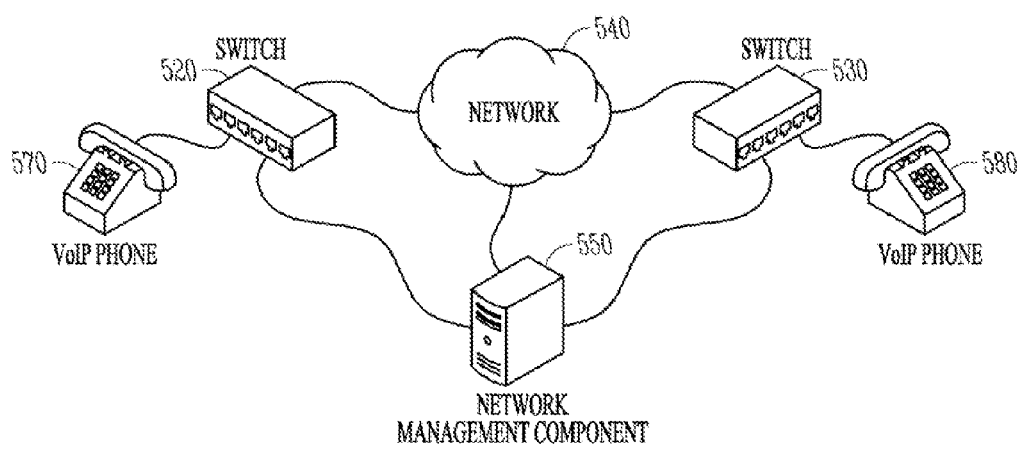
FIG. 5 is a schematic diagram illustrating an alternative embodiment of the invention.

FIG. 5 is a diagram of another embodiment of this invention where the functions performed by the probes and time synchronization server in the embodiments described above are integrated into a network management component 550.

This single component configuration minimizes out-of-band communication requirements and eliminates the necessity for separate probes or a separate time synchronization server. The network management component 550 monitors the communication between the VoIP phone 570 and VoIP phone 580 through the switches 520 and 530, which are the same access points whereby the VoIP phones 570 and 580, respectively, are connected to the network 540. In this embodiment, the capturing and processing of data packets and the latency calculations are performed within the network management component 550 according to capture instructions programmed on the network management component 550.

The specifics within the capture instructions can be modified in alternative embodiments to accommodate various scenarios and equipment such as increased latency reporting requirements, decreased capability of the probes to capture and process data, and different types of communication being monitored. For example, the capture time window can be set for shorter or longer periods of time and the probes can be programmed using the capture instructions to only sample data rather than capture all data packets. The probes can be instructed to perform any combination of storing the monitored data, processing the monitored data, or transmitting the monitored data immediately to another device for any combination of storing, processing, or transmitting.

The embodiments described above measure the latency of traffic transmitted by devices communicating across a network by utilizing passive monitoring that does not disrupt the flow of the network traffic that is being measured. This invention allows for flexibility because the components can be arranged in a multiplicity of configurations to measure the communication between a variety of devices while employing the same basic passive monitoring principle. While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A method for execution by one or more processors, the method comprising:
periodically synchronizing a time clock of a first probe connected to a first access point on a data network with a time clock of a second probe connected to a second access point on the data network, the frequency with which the synchronization occurs is increased or decreased based upon sensitivity to variations in timing of communications over the data network;
receiving a first capture time corresponding to a first time that a data packet is received at the first probe, the data packet being from the existing network traffic transmitted over the data network, the first probe being configured to capture the data packet in response to a first capture instruction;
receiving a second capture time corresponding to a second time that the data packet is received at the second probe, the second probe being configured to capture the data packet in response to a second capture instruction, the first time and second time being different; and
calculating, using one or more processors, the latency of at least a portion of the data network based on the first capture time and the second capture time.

2. The method of claim 1, further comprising:
receiving a first data packet identifier associated with the data packet and associated with the first capture time;
receiving a second data packet identifier associated with the data packet and associated with the second capture time; and
associating, using the first data packet identifier and the second data packet identifier, the first capture time and the second capture time to calculate the latency.

3. The method claim 1, wherein the first and second probes are programmed without disrupting the flow of the existing network traffic being measured for latency.

4. The method of claim 1, wherein at least one of the first probe or the second probe is integrated into a network device.

5. The method of claim 1, wherein the data packet is an inbound data packet, the method further comprising:
receiving a third capture time corresponding to a third time that an outbound data packet is received at the first probe;
receiving a fourth capture time corresponding to a fourth time that the outbound data packet is received at the second probe, the third time and fourth time being different; and
calculating the latency of at least a portion of the data network using the third capture time and the fourth capture time.

6. The method of claim 1, wherein the calculating includes calculating at a network management component, the network management component receives the first data packet identifier, the second data packet identifier, the first capture time, and the second capture time without disrupting the flow of the existing network traffic being measured for latency.

7. The method of claim 1, further comprising:
sending the first capture time from the first probe to the second probe, the calculating includes calculating at the second probe.

8. The method of claim 1, wherein the data packet is from a set of data packets captured from the existing network traffic, the calculating includes calculating based on a set of capture times associated with the set of data packets.

9. The method of claim 1, wherein calculating the latency includes distributing the calculation between at least two of the first probe, the second probe, or a network management component.

10. The method of claim 9, wherein the first probe calculates the latency for first type of existing network traffic and wherein the second probe calculates the latency for a second type of existing network traffic.

11. The method of claim 10, wherein the first type of network traffic comprises outbound traffic for a first network device and wherein the second type of network traffic comprises outbound traffic for a second network device.

12. The method of claim 1, wherein the first capture instruction is sent from a network management component.

13. The method of claim 1, wherein the second capture instruction is sent from a network management component.

14. The method of claim 13, wherein the first capture instruction is sent from a network management component.

15. The method of claim 1, wherein the first or second capture instructions include one of a start capture time, a capture time window, an instruction for assigning a capture time, and a reporting instruction.

16. An apparatus for measuring a latency of at least a portion of a data network, comprising:
a first probe connected to the data network and configured to capture a data packet from existing network traffic according to a first capture instruction, the first probe being configured to assign a first capture time corresponding to a time of capture by the first probe;

a second probe connected to the data network and configured to capture the data packet from the existing network traffic according to a second capture instruction, the second probe being configured to assign a second capture time corresponding to a time of capture by the second probe; and a time synchronization server configured to periodically synchronize a time clock of the first probe with a time clock of the second probe, the frequency with which the synchronization occurs is increased or decreased based upon sensitivity to variations in timing of communications over the data network.

17. The apparatus of claim 16, wherein the first probe is configured to send and receive a data packet identifier associated with the captured data packet without disrupting the flow of existing network traffic being measured for latency, the data packet identifier corresponds with the first capture time.

18. The apparatus of claim 16, wherein the first probe is configured to receive the second capture time from the second probe, the first probe is configured to calculate the latency of the portion of the data network using the first capture time and the second capture time.

19. The apparatus of claim 18, wherein the second probe is configured to receive the first capture time from the first probe, the second probe is configured to calculate the latency of the portion of the data network using the first capture time and the second capture time.

20. The apparatus of claim 16, wherein a network management component is configured to receive the first capture time from the first probe and the second capture time from the second probe, the network management component is configured to calculate the latency of the portion of the data network using the first capture time and the second capture time, the network management component is configured to communicate with the first and second probes without disrupting the flow of existing network traffic being measured for latency.

21. The apparatus of claim 16, wherein a network management component is configured to receive the first capture time based on the first probe and the second capture time from the second probe, the network management component is configured to calculate the latency of the portion of the data network based on the first capture time and the second capture time, the network management component, first probe, second probe, and time synchronization server are integrated into a single device.

22. The apparatus of claim 16, further comprising a network management component configured to issue the first capture instruction specifying a device to receive the first capture time and the second capture instruction specifying the device to receive the second capture time.

23. The apparatus of claim 16, wherein the first or second capture instructions include one of a start capture time, a capture time window, an instruction for assigning a capture time, and a reporting instruction.

* * * * *

UNITED STATES PATENT AND TRADEMARK OFFICE
CERTIFICATE OF CORRECTION

| | | |
|---|---|---|
| PATENT NO. | : 8,243,599 B2 | |
| APPLICATION NO. | : 11/555484 | |
| DATED | : August 14, 2012 | |
| INVENTOR(S) | : Becker et al. | |

It is certified that error appears in the above-identified patent and that said Letters Patent is hereby corrected as shown below:

In column 10, line 46, in claim 10, delete "for first" and insert --for a first,--, therefor Signed and Sealed this
Thirteenth Day of November, 2012

David J. Kappos
*Director of the United States Patent and Trademark Office*